R. H. HOUGH & L. J. STERN.
ART OF PROJECTING IMAGES ON SCREENS.
APPLICATION FILED FEB. 25, 1914.
1,132,269.
Patented Mar. 16, 1915.
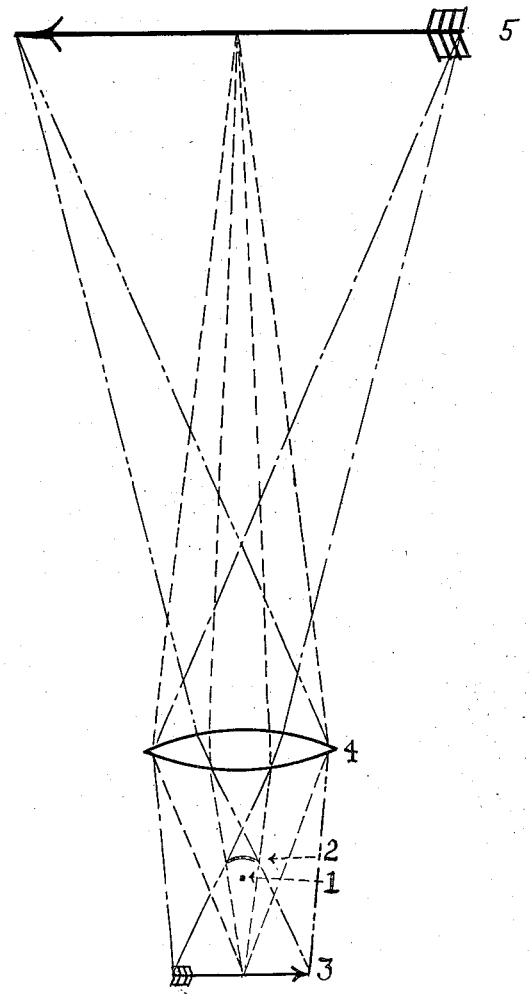
WITNESSES:
INVENTORS:

UNITED STATES PATENT OFFICE.

ROBERT H. HOUGH AND LEWIS J. STERN, OF PHILADELPHIA, PENNSYLVANIA.

ART OF PROJECTING IMAGES ON SCREENS.

1,132,269.   Specification of Letters Patent.   Patented Mar. 16, 1915.

Application filed February 25, 1914. Serial No. 821,042.

*To all whom it may concern:*

Be it known that we, ROBERT H. HOUGH and LEWIS J. STERN, citizens of the United States, residing in the city and county of Philadelphia and State of Pennsylvania, have invented new and useful Improvements in the Art of Projecting Images on Screens.

This invention relates particularly to the projection of images of opaque objects.

In the existing types of apparatus used for this purpose the illuminating source is placed outside of the path of the light from the object to the lens. In order to secure a uniform illumination of the object when the source is placed outside of the path of the light from the object to the lens, it is necessary to place the source at a relatively large distance from the object, so that the variations of distance are small compared to the average distance. Therefore, to secure a high uniform illumination of the object it is necessary to use a source of very great illuminating power, since the illuminating power varies as the square of the distance for any given illumination.

In the present invention the source of illumination is placed in the path of the light from the object to the lens, and preferably in the major axis of the lens. The direct light from the source of illumination to the lens is cut off from the lens and reflected to the object by means of a small reflector.

Referring to the diagram accompanying and forming part of this specification, #1 is the source of illumination, #2 is the reflector or shield, #3 is the object, #4 is the lens and #5 is the image on the screen. The direct light from the source #1 and the reflected light from the reflector or shield #2 illuminate the object #3. The diffused light from each point of the object #3 passes through the lens and is focused upon the screen forming the conjugate point of the image #5. There is no image of the source #1, the reflector or shield #2 and their supporting parts on the screen as they are out of focus. For a given illumination of the object, by this arrangement a source of much smaller illuminating power is required.

What we claim as new and useful, and desire to secure by Letters Patent of the United States is as follows:

1. In an apparatus for the projection of images of opaque objects upon a screen, the combination of a source of illumination, a reflector or shield, and lens, so arranged that the source of illumination and reflector or shield are in the path of the light from the object to the lens, substantially as set forth.

2. In an apparatus for the projection of images of opaque objects upon a screen, the combination of a lens, a reflector arranged in the path of the light from the object to the lens, and a source of illumination arranged to project reflected light from the reflector to the object, substantially as described.

3. In an apparatus for the projection of images of opaque objects upon a screen, the combination of a source of illumination, a reflector or shield and lens, so arranged that the reflector or shield and the source of illumination coöperate to project the light of illumination from a position in the path of light from the object to the lens.

4. In an apparatus for the projection of images of opaque objects upon a screen, the combination of a lens and means, including a reflector or shield, for illuminating the object, said means being so arranged that the reflector or shield and the position from which the illuminating light rays directly proceed toward the object are in the path of the light from the object to the lens, substantially as described.

5. In an apparatus for the projection of images of opaque objects upon a screen, the combination of a lens, a reflector arranged in the path of the light from the object to the lens, and a source of illumination arranged to project light directly toward the object from a point substantially in the major axis of the lens, substantially as described.

ROBERT H. HOUGH.
LEWIS J. STERN.

Witnesses:
WILLIAM E. MITCHELL,
MARY H. STERN.